(12) United States Patent
Kiesel et al.

(10) Patent No.: US 12,527,531 B2
(45) Date of Patent: Jan. 20, 2026

(54) SYSTEM WITH COMPUTED TOMOGRAPHY GANTRY AND LIFTING APPARATUS

(71) Applicant: Siemens Healthineers AG, Forchheim (DE)

(72) Inventors: Jan-Christoph Kiesel, Bayreuth (DE); Stefan Gross, Trabitz (DE); Michael Atzinger, Seybothenreuth (DE); Klaus Hruschka, Erbendorf (DE); Daniel Raschke, Bayreuth (DE); Stefan Hesl, Eschenbach (DE); Ralf Gaertner, Kemnath (DE); Matthias Hupfauf, Nabburg (DE); Georg Walberer, Kastl (DE); Wolfgang Neuber, Eschenbach (DE); Ulli Alfred Kassler, Nuremberg (DE); Rita Krug, Fuerth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/616,743

(22) Filed: Mar. 26, 2024

(65) Prior Publication Data

US 2024/0324974 A1    Oct. 3, 2024

(30) Foreign Application Priority Data

Mar. 31, 2023    (EP) .................................... 23166130

(51) Int. Cl.
*A61B 6/00* (2024.01)
*A61B 6/03* (2006.01)

(52) U.S. Cl.
CPC ............ *A61B 6/035* (2013.01); *A61B 6/4435* (2013.01)

(58) Field of Classification Search
CPC .......... A61B 6/035; A61B 6/44; A61B 6/4435
See application file for complete search history.

(56) References Cited

U.S. PATENT DOCUMENTS

| 2003/0095635 A1* | 5/2003 | Moritake | A61B 6/035 378/198 |
| 2011/0222667 A1* | 9/2011 | Gregerson | A61B 6/4435 378/198 |

(Continued)

FOREIGN PATENT DOCUMENTS

| CN | 203736215 U | 7/2014 |
| CN | 105196893 A | 12/2015 |

(Continued)

OTHER PUBLICATIONS

European Communication under Rule 71(3) EPC for European Application No. 23166130.7 mailed Oct. 15, 2024.

(Continued)

*Primary Examiner* — Dani Fox
(74) *Attorney, Agent, or Firm* — Harness, Dickey & Pierce, P.L.C.

(57) ABSTRACT

The system includes a computed tomography gantry, a cart, a rail system, a rotary bearing and a lifting apparatus. In a translational operating state of the system, the cart is mounted to be movable along the rail system in a first translational motion along the rail system. The computed tomography gantry, the rotary bearing and the lifting apparatus are each held in the cart such that they follow the first translational motion of the cart. In the transitional operating state of the system, the cart is mounted to be movable, via the lifting apparatus, along a vertical axis of rotation relative to the rail system in a lifting motion, wherein the computed tomography gantry is held in the cart and follows the lifting motion of the cart relative to the rail system.

20 Claims, 5 Drawing Sheets

(56) References Cited

U.S. PATENT DOCUMENTS

| | | | |
|---|---|---|---|
| 2014/0294159 A1 | 10/2014 | Gregerson et al. | |
| 2015/0375638 A1 | 12/2015 | Farooq et al. | |
| 2022/0061789 A1* | 3/2022 | Dickmann | A61B 6/4405 |
| 2024/0110639 A1 | 4/2024 | Weber et al. | |

FOREIGN PATENT DOCUMENTS

| | | |
|---|---|---|
| CN | 106073820 A | 11/2016 |
| CN | 110507345 A | 11/2019 |
| CN | 211131120 U | 7/2020 |
| CN | 212521791 U | 2/2021 |
| DE | 102012201527 A1 | 5/2013 |
| DE | 102020210968 A1 | 11/2021 |
| DE | 102021202983 A1 | 4/2022 |
| DE | 102022210340 A1 | 4/2024 |
| WO | WO 2011112307 A1 | 9/2011 |

OTHER PUBLICATIONS

Extended European Search Report for European Application No. 23166130.7 mailed Sep. 25, 2023.

European Decision to Grant for European Application No. 23166130.7 mailed Feb. 27, 2025.

* cited by examiner

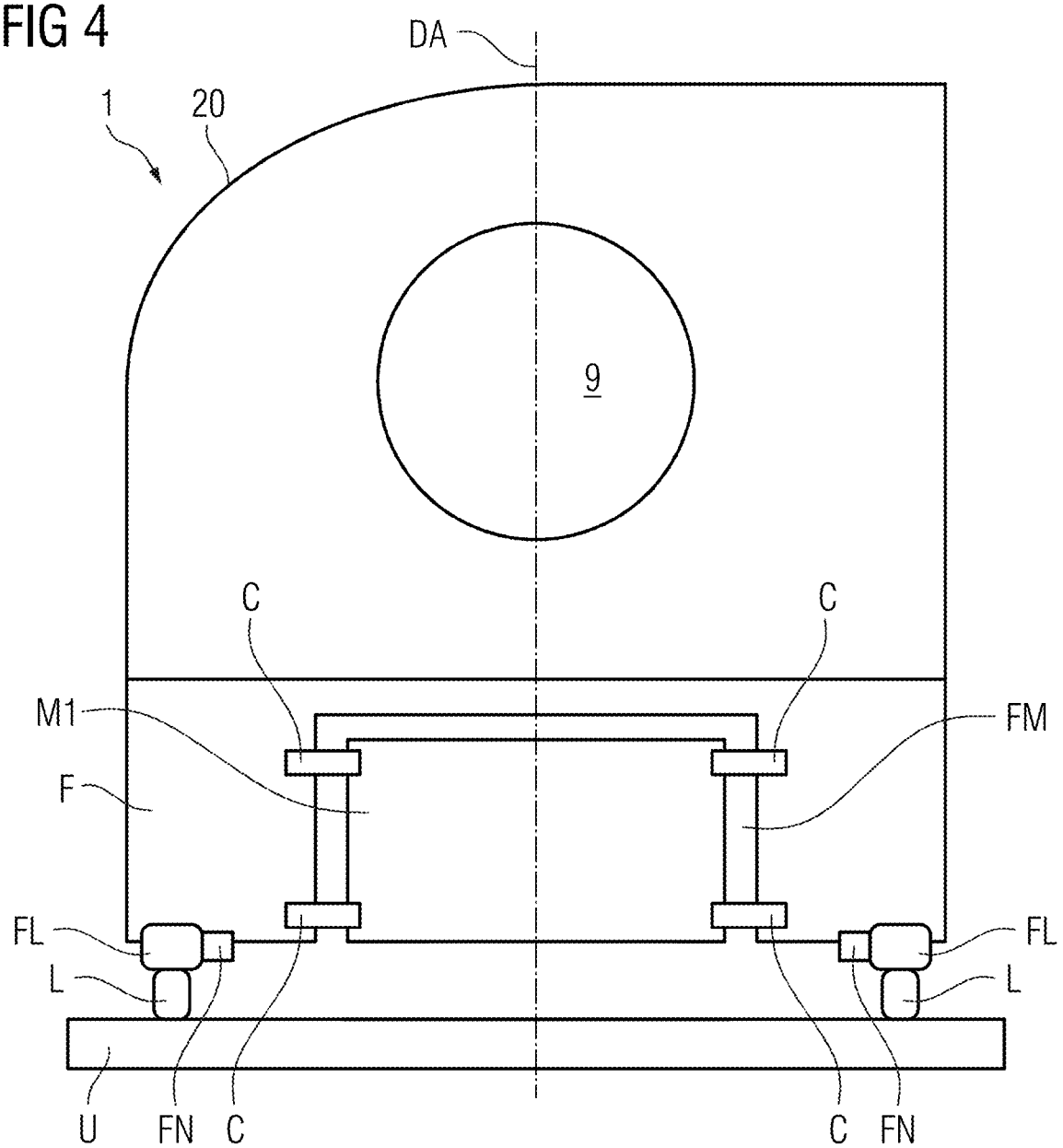

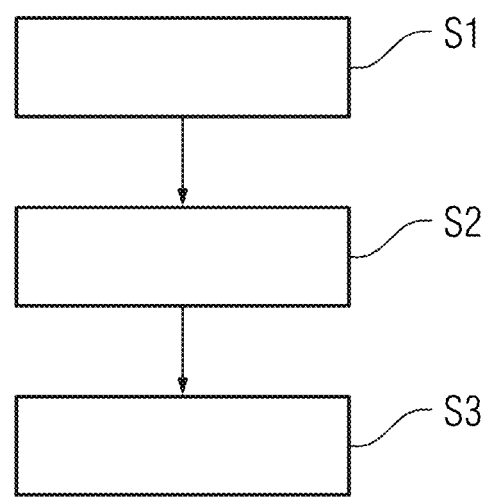

SYSTEM WITH COMPUTED TOMOGRAPHY GANTRY AND LIFTING APPARATUS

CROSS-REFERENCE TO RELATED APPLICATION(S)

The present application claims priority under 35 U.S.C. § 119 to European Patent Application No. 23166130.7, filed Mar. 31, 2023, the entire contents of which is incorporated herein by reference.

FIELD

One or more example embodiments of the present invention relate to a system and a method for moving a computed tomography gantry.

BACKGROUND

A computed tomography system (CT system) is sometimes used for two adjacent treatment areas. This is due on one hand to considerations of cost, to avoid the need for a CT system to be installed in each of the two areas. On the other hand, a mobile CT system that can be moved into a different area also has advantages in respect of space requirements.

When using two treatment areas which are situated opposite each other, the patient couches can be arranged with the heads facing each other, for example. This means that the CT system can travel back and forth between the two patient couches, such that the computed tomography gantry is arranged in one treatment area with one side oriented towards the patient couch, and in the opposite treatment area with the other side oriented towards the patient couch. These differing arrangements of the computed tomography gantry relative to the respective patient couch must be taken into account when processing the imaging data.

In many CT systems, the scanning plane is arranged substantially midway or centrally in the housing of the computed tomography gantry. In some CT systems however, the scanning plane is not arranged midway in the housing of the computed tomography gantry. There is consequently a front side of the computed tomography gantry and a rear side of the computed tomography gantry. When using two treatment areas which are situated opposite each other, it would then be advantageous to align the computed tomography gantry such that the front side is always oriented towards the respective patient couch. The computed tomography gantry must therefore, for a two-area solution with two patient couches arranged with the heads facing each other, be rotatable about 180° in order to be aligned with its front side oriented towards the respective patient couch in each case.

SUMMARY

An object of one or more example embodiments of the present invention is to provide an alternative to conventional movement of a computed tomography gantry.

At least this object is achieved by the subject matter described herein.

Independent of the grammatical term usage, individuals with male, female or other gender identities are included within the term.

An embodiment of the present invention relates to a system, comprising a computed tomography gantry, a cart, a rail system, a rotary bearing and a lifting apparatus, wherein in a translational operating state of the system, the cart is mounted in such a way that it can be moved along the rail system, particularly in a rolling manner, such that a first translational motion of the cart along the rail system can be executed, wherein the computed tomography gantry, the rotary bearing and the lifting apparatus are each held in the cart in such a way that they follow the first translational motion of the cart, wherein in a transitional operating state of the system, the cart is mounted in such a way that it can be moved along a vertical axis of rotation relative to the rail system via the lifting apparatus, such that a lifting motion of the cart along the vertical axis of rotation relative to the rail system can be executed, wherein the computed tomography gantry is held in the cart in such a way that it follows the lifting motion of the cart relative to the rail system, wherein in a rotational operating state of the system, the cart has been lifted along the vertical axis of rotation relative to the rail system via the lifting apparatus such that the cart is detached from the rail system, and the cart is mounted in such a way that it can be rotated about the vertical axis of rotation relative to the rail system via the rotary bearing, such that a rotational motion of the cart about the vertical axis of rotation relative to the rail system can be executed, wherein the computed tomography gantry is held in the cart in such a way that it follows the rotational motion of the cart about the vertical axis of rotation relative to the rail system.

Provision can be made in particular such that, in the transitional operating state of the system, the cart is mounted in such a way that it can be moved relative to the rail system along a vertical axis of rotation via the lifting apparatus, such that a lowering motion of the cart along the vertical axis of rotation relative to the rail system can be executed, wherein the computed tomography gantry is held in the cart in such a way that it follows the lowering motion of the cart relative to the rail system.

Provision can be made in particular for the system to have a travel drive and/or a rotary drive. The travel drive can be configured in particular to drive the first translational motion of the cart and/or to drive the second translational motion of the cart. The rotary drive can be configured in particular to drive the rotational motion of the cart relative to the rail system about the vertical axis of rotation. The rotary bearing can be a rolling bearing, for example, in particular an axial rolling bearing. Instead of providing a rotary drive, the system can also be configured for manual driving of the rotational motion of the cart relative to the rail system about the vertical axis of rotation, e.g. using the physical strength of an operator.

The lifting apparatus can comprise e.g. a set of lifting cylinders and/or a lifting drive. Provision can be made in particular for the rotary bearing to be arranged, relative to a horizontal direction, between two lifting cylinders in the set of lifting cylinders and/or for the lifting cylinders in the set of lifting cylinders to be synchronized with each other via a shaft, for example. The horizontal direction can be in particular essentially perpendicular to the first translational motion.

For example, the computed tomography gantry can therefore be arranged in a manner which is rotatable, in particular about 180°, such that in two treatment areas which are situated opposite each other, each of two patient couches that are arranged with the heads facing each other can be approached with the front side of the computed tomography gantry. The two treatment areas will then be equivalent with regard to the generation of imaging data, so far as the orientation of the computed tomography gantry relative to the respective patient couch is concerned.

Provision can be made in particular for the system to have a base. The rail system can be in particular stationary relative to the base and/or permanently anchored in the base. The base can be e.g. a floor, in particular a floor of a treatment area, and/or a floor plate and/or an underlayer. Provision can be made in particular for the surface of the base to be substantially horizontal, in particular horizontal.

The first translational motion can be in particular horizontal and/or parallel to the base. The second translational motion can be in particular horizontal and/or parallel to the base. The first translational motion can take place e.g. on a straight first path and/or on a curved first path. The second translational motion can take place e.g. on a straight second path and/or on a curved second path. The rail system can be configured in particular to allow a translation of the cart between two treatment areas.

The system can comprise in particular a cable guide which is configured to link the computed tomography gantry and/or the cart to an energy transmission device that is stationary relative to the base and/or to a data transmission device that is stationary relative to the base, in particular during the first horizontal translational motion of the cart and/or during the rotational motion of the cart relative to the rail system. The cable guide can be ceiling-mounted and/or floor-mounted, for example. The cable guide can comprise e.g. a cable pillar which is permanently connected to the cart and/or to the computed tomography gantry, which cable pillar is flexibly connected to the energy transmission device that is stationary relative to the base and/or to the data transmission device that is stationary relative to the base. The system can comprise e.g. a transmission interface for the transmission, in particular bidirectional transmission, of energy and/or data between the cart and the computed tomography gantry. The transmission interface can be contact-based and/or contactless, for example.

Provision can be made in particular for an examination object to be static relative to the rail system and/or relative to the base. In particular, the rail system can form a linear guide for the cart.

For example, the system can have an examination table for the purpose of supporting an examination object. The examination table can be in particular static relative to the rail system and/or relative to the base and/or permanently anchored relative to the rail system and/or relative to the base. The examination object can be e.g. a person to be examined, in particular a patient, and/or supported on the examination table, in particular supported in a static manner relative to the examination table.

The computed tomography gantry can comprise e.g. a support frame and a rotor which is rotatably mounted relative to the support frame, the radiation source and the radiation detector being arranged on the rotor. The computed tomography gantry can optionally comprise a tilting frame which is tiltably mounted relative to the support frame, the rotor being arranged on the tilting frame. The radiation source and the radiation detector can interact for the purpose of recording a projection data set relating to the examination object. The computed tomography gantry can have an opening, for example. In particular, the rail system, the examination table and the opening can be reciprocally arranged such that, as a result of the first translational motion of the computed tomography gantry, the examination table is introduced into the opening, in particular together with the examination object supported on the examination table.

An embodiment variant provides for the rail system to have a set of rails, with the cart having a set of wheels, with the rotational motion of the cart about the vertical axis of rotation relative to the rail system taking place from a first angle about the vertical axis of rotation to a second angle about the vertical axis of rotation, wherein the set of wheels is arranged in relation to the vertical axis of rotation such that the set of wheels can roll on the set of rails when the cart is arranged in the first angle about the vertical axis of rotation relative to the rail system, and such that the set of wheels can roll on the set of rails when the cart is arranged in the second angle about the vertical axis of rotation relative to the rail system.

For example, for each wheel in the set of wheels, the cart can have a direct wheel drive which engages with the respective wheel. The direct wheel drive can comprise e.g. an electric motor, in particular an electric wheel hub motor. In particular, provision can be made for the travel drive to consist of all the direct wheel drives for the wheels in the set of wheels.

Provision can be made in particular for the set of rails and the set of wheels to form a set of wheel-to-rail rolling contacts. Provision can be made in particular for each rail in the set of rails to be a round rail and/or for each wheel in the set of wheels to be a concave roller and/or designed to roll on a round rail. The rails and/or the wheels can be made from steel, for example. In particular, the round rails can be integrated into the floor without any covering or drive elements, and in this way can be traversed by patient beds and instrument tables.

An embodiment variant provides for an absolute value of an angular difference between the first angle about the vertical axis of rotation and the second angle about the vertical axis of rotation to be greater than 0° and less than 360°, in particular greater than 10° and less than 350°, e.g. greater than 175° and less than 185°, in particular equal to 180° degrees.

An embodiment variant provides for the system further to comprise a supporting structure, with the rail system being static relative to the supporting structure, wherein in the translational operating state of the system, the cart is mounted in such a way that it can be moved along the rail system relative to the supporting structure, such that the first translational motion of the cart along the rail system relative to the supporting structure can be executed, wherein in the transitional operating state of the system and in the rotational operating state of the system, the cart is braced against the supporting structure via the lifting apparatus and the rotary bearing.

Provision can be made in particular for the rail system to be static relative to the supporting structure while the system is in the translational operating state of the system, while the system is in the transitional operating state of the system, and while the system is in the rotational operating state of the system.

The supporting structure can be arranged in particular beneath the cart in relation to the vertical axis of rotation. The supporting structure can be e.g. a region of the base and/or a supporting plate. For example, provision can be made for the supporting plate to be permanently anchored relative to the base and/or sunken into the base, in particular sunken in such a way that a surface of the supporting plate is flush with a surface of the base.

Provision can be made in particular such that the cart can be propelled by the first translational motion into a rotary position relative to the supporting structure, in which position, as a result of bracing the lifting apparatus against the supporting structure, the cart can be raised along the vertical axis of rotation relative to the supporting structure via the lifting apparatus.

An embodiment variant provides for the system to comprise a socket structure, said socket structure being mounted in such a way that it can be moved along the vertical axis of rotation relative to the cart via the lifting apparatus, and said socket structure being mounted in such a way that it can be rotated about the vertical axis of rotation relative to the cart via the rotary bearing. Provision can be made in particular for the socket structure to be relatively connected to the lifting apparatus via the rotary bearing, and mounted in such a way that it can be rotated about the vertical axis of rotation relative to the lifting apparatus.

The socket structure can be connected to the cart via the lifting apparatus and the rotary bearing, in particular in such a way that the socket structure follows the first translational motion of the cart. The lifting apparatus can be held in the cart in particular in such a way that an extent of the lifting apparatus along the vertical axis of rotation is variable. Provision can be made in particular for the extent of the lifting apparatus along the vertical axis of rotation to be greater in the rotational operating state of the system than in the translational operating state of the system.

The system can have a locking unit in particular, the socket structure in the translational operating state of the system being secured by the locking unit against a change of angle about the vertical axis of rotation relative to the cart.

Provision can be made in particular such that the lifting apparatus is configured to increase a separation, in comparison with the translational operating state of the system, between the socket structure and the cart along the vertical axis of rotation, in particular such that a gap between the socket structure and the supporting structure is thereby decreased, and as a result of the socket structure pressing against the supporting structure, to raise the cart relative to the rail system along the vertical axis of rotation such that the cart is detached from the rail system, wherein the pressing of the socket structure against the supporting structure causes the socket structure to be secured against any change of angle about the vertical axis of rotation relative to the supporting structure, such that the cart is mounted in such a way that it can be rotated about the vertical axis of rotation relative to the supporting structure and thus in particular relative to the rail system via the rotary bearing, so that the system transitions into the rotational operating state of the system.

An embodiment variant provides for the socket structure to be frictionally secured against the change of angle about the vertical axis of rotation relative to the supporting structure as a result of the socket structure pressing against the supporting structure, such that the cart is mounted in such a way that it can be rotated about the vertical axis of rotation relative to the supporting structure and thus in particular relative to the rail system via the rotary bearing.

An embodiment variant provides for a top side of the supporting structure to be substantially planar, in particular horizontal, and/or for a bottom side of the socket structure to be substantially planar, in particular horizontal. Provision can be made in particular for the pressing of the socket structure against the supporting structure to produce a frictional engagement between the top side of the supporting structure and the bottom side of the socket structure, said frictional engagement causing the socket structure to be frictionally secured against the change of angle about the vertical axis of rotation relative to the supporting structure, such that the cart is mounted in such a way that it can be rotated about the vertical axis of rotation relative to the supporting structure and thus in particular relative to the rail system via the rotary bearing.

An embodiment variant provides for the lifting apparatus to be configured to decrease the separation, in comparison with the rotational operating state of the system, between the socket structure and the cart along the vertical axis of rotation, in particular such that the gap between the socket structure and the supporting structure is increased thereby, and thereby to lower the cart relative to the rail system along the vertical axis of rotation until the cart is deposited on the rail system, so that the system transitions into the translational operating state of the system.

An embodiment variant provides for the lifting apparatus and the rotary bearing to be directly coupled together, thereby forming a lift-and-rotate module, with the cart having a recess for holding the lift-and-rotate module, with the lift-and-rotate module being arranged in the recess in such a way that the lifting apparatus can extend downwards along the vertical axis of rotation and out of the recess in order to raise the cart relative to the rail system along the vertical axis of rotation. The lift-and-rotate module is detachably connected to the cart via a mechanical interface and an electrical interface. The lift-and-rotate module can therefore be removed from the cart and/or installed therein with little effort. In particular, the lift-and-rotate module can be designed in the form of a plunger.

Another embodiment of the present invention relates to a method for moving a computed tomography gantry, said method comprising:

executing a first translational motion of a cart along a rail system while a system which comprises the computed tomography gantry, the cart, the rail system, a rotary bearing and a lifting apparatus is in a translational operating state of the system, wherein in the translational operating state of the system, the cart is mounted in such a way that it can be moved along the rail system, wherein the computed tomography gantry, the rotary bearing and the lifting apparatus are each held in the cart in such a way that they follow the first translational motion of the cart, executing a lifting motion of the cart relative to the rail system along a vertical axis of rotation while the system is in a transitional operating state of the system, wherein in the transitional operating state of the system, the cart is mounted in such a way that it can be moved along a vertical axis of rotation relative to the rail system via the lifting apparatus, wherein the computed tomography gantry is held in the cart in such a way that it follows the lifting motion of the cart relative to the rail system, executing a rotational motion of the cart relative to the rail system about the vertical axis of rotation while the system is in a rotational operating state of the system, wherein in the rotational operating state of the system, the cart has been lifted along the vertical axis of rotation relative to the rail system via the lifting apparatus such that the cart is detached from the rail system, and the cart is mounted in such a way that it can be rotated about the vertical axis of rotation relative to the rail system via the rotary bearing, wherein the computed tomography gantry is held in the cart in such a way that it follows the rotational motion of the cart relative to the rail system about the vertical axis of rotation.

According to an embodiment variant, following the execution of the rotational motion of the cart relative to the rail system about the vertical axis of rotation, provision is made for executing a lowering motion of the cart relative to the rail system along the vertical axis of rotation while the system is in the transitional operating state of the system, wherein the computed tomography gantry is held in the cart in such a way that it follows the lowering motion of the cart relative to the rail system.

According to an embodiment variant, following an execution of the lowering motion of the cart relative to the rail system along the vertical axis of rotation, provision is made for executing a second translational motion of the cart along the rail system while the system is in the translational operating state of the system, wherein the computed tomography gantry, the rotary bearing and the lifting apparatus are each held in the cart in such a way that they follow the second translational motion of the cart.

Provision can be made in particular for the rail system to have a set of rails, with the cart having a set of wheels, with the rotational motion of the cart about the vertical axis of rotation relative to the rail system taking place from a first angle about the vertical axis of rotation to a second angle about the vertical axis of rotation, wherein during the first translational motion of the cart along the rail system, the cart is arranged in the first angle about the vertical axis of rotation relative to the rail system and the set of wheels rolls on the set of rails, and wherein during the second translational motion of the cart along the rail system, the cart is arranged in the second angle about the vertical axis of rotation relative to the rail system and the set of wheels rolls on the set of rails.

Provision can further be made such that, following the rotational motion of the cart about the vertical axis of rotation relative to the rail system, the set of wheels can be arranged on the set of rails in a rolling manner by lowering the cart along the vertical axis of rotation.

An embodiment variant provides for the system further to comprise a supporting structure, with the rail system being static relative to the supporting structure, wherein the first translational motion of the cart along the rail system relative to the supporting structure is executed while the system is in the translational operating state of the system, wherein following the execution of the first translational motion of the cart along the rail system relative to the supporting structure, the cart is braced against the supporting structure via the lifting apparatus and the rotary bearing, in particular is braced in such a way that the system transitions into the transitional operating state of the system.

An embodiment variant provides for the system to comprise a socket structure, said socket structure being mounted in such a way that it can be moved along the vertical axis of rotation relative to the cart via the lifting apparatus, and said socket structure being mounted in such a way that it can be rotated about the vertical axis of rotation relative to the cart via the rotary bearing.

Provision can be made in particular such that, in comparison with the translational operating state of the system, a separation between the socket structure and the cart along the vertical axis of rotation is increased via the lifting apparatus, and as a result of the socket structure pressing against the supporting structure, the cart is raised relative to the rail system along the vertical axis of rotation such that the cart is detached from the rail system, wherein the pressing of the socket structure against the supporting structure causes the socket structure to be secured against any rotation about the vertical axis of rotation relative to the supporting structure, in particular to be secured such that the cart is mounted in such a way that it can be rotated about the vertical axis of rotation relative to the supporting structure and thus in particular relative to the rail system via the rotary bearing, so that the system transitions into the rotational operating state of the system.

An embodiment variant provides for the socket structure to be frictionally secured against rotation about the vertical axis of rotation relative to the supporting structure as a result of the socket structure pushing against the supporting structure.

Provision can further be made for the system to be configured for accelerations of the computed tomography gantry in a scan direction of 265 mm/s$^2$ during a scan procedure, for the system to be configured for accelerations of the computed tomography gantry in a scan direction of 1400 mm/s$^2$ in the event of an emergency stop, and/or for the rotational motion of the cart relative to the rail system about the vertical axis of rotation to be completed in less than 60 seconds, in particular in less than 40 seconds, e.g. in approximately 30 seconds.

The cabling between the computed tomography gantry and the cart can be direct and in particular need not pass through the rotary bearing. Therefore less cable length is required. This also means that the cable is not subjected to repeated stresses caused by rotation of the computed tomography gantry relative to the cart, such that less resilient cable can be used. The design of the cable installation is also more flexible, resulting in cost advantages and functional advantages. Accessibility for assembly and servicing is also better.

Provision can be made in particular for the computed tomography gantry to be fixedly arranged relative to the cart with reference to the vertical axis of rotation, and in particular secured against a change of angle. Measures to protect against shear movements of the computed tomography gantry relative to the cart are therefore unnecessary.

By virtue of the computed tomography gantry being held in the cart directly and not via the rotary bearing while the system is in the translational operating state, the mechanical stability is improved and hence the image quality likewise. In particular, vibrations of the computed tomography gantry in the translational operating state can be avoided. As a result of depositing the cart on the rail system after the rotational motion, the cart can be arranged precisely and identically relative to the rail system with reference to the vertical axis of rotation, in particular with reference to the 0° position and the 180° position.

By virtue of the modular construction, it is simple to define possible variants of the cart with and without a rotary function, said variants differing in respect of only a few structural elements. This increases the number of possible uses and reduces the costs of both product and product lifecycle. The lift-and-rotate module can be manufactured, tested and delivered separately, for example. The module can be installed/exchanged for the first time locally in the examination area. The cart can then be handled more easily and hence more effectively. The module can be maintained separately, in particular outside of the cart.

In the context of the present invention, features which are described with reference to different embodiment variants of the present invention and/or with reference to different statutory classes of claim (method, use, apparatus, system, arrangement, etc.) can be combined to form further embodiment variants of the present invention. For example, a claim which relates to a system can also be developed with features that are described or claimed in connection with a method, and vice versa. In this way, functional features of a method can be embodied by physical components of corresponding design. The use of the indefinite article "a" or "an" does not preclude multiple instances of the feature concerned. In the context of the present application, the expression "on the basis of" can be understood in particular in the sense of the expression "using". In particular, wording according to which a first feature is calculated (or alternatively: determined, generated, etc.) on the basis of a second feature does not preclude the first feature possibly being also calculated (or alternatively: determined, generated, etc.) on the basis of a third feature.

BRIEF DESCRIPTION OF THE DRAWINGS

The present invention is explained below in greater detail on the basis of exemplary embodiments and with reference to the appended figures. The illustration in the figures is schematic, greatly simplified and not necessarily true to scale.

FIG. 4 shows a system without a lift-and-rotate module.

FIG. 5 shows a sequence diagram of a method for moving a computed tomography gantry.

DETAILED DESCRIPTION

Figure 1:
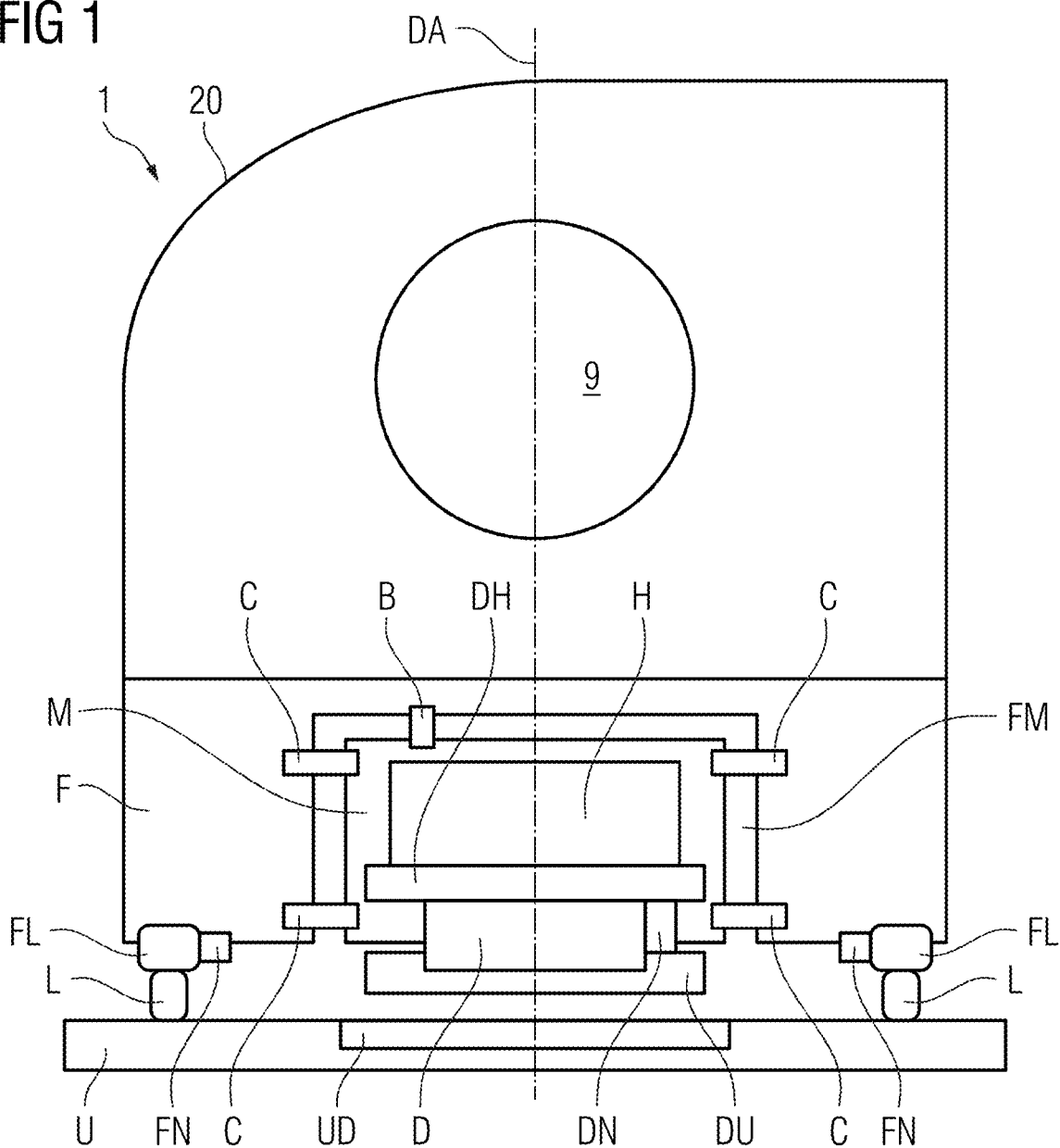
FIG. 1 shows a system comprising a computed tomography gantry, a cart and a rail system in a translational operating state of the system.

FIG. 1 shows the system 1 comprising the computed tomography gantry 20, the cart F, the rail system L, the rotary bearing D and the lifting apparatus H in a translational operating state of the system 1, wherein in the translational operating state of the system 1, the cart F is mounted in such a way that it can be moved along the rail system L, such that a first translational motion of the cart F along the rail system L can be executed, wherein the computed tomography gantry 20, the rotary bearing D and the lifting apparatus H are each held in the cart F in such a way that they follow the first translational motion of the cart F. The computed tomography gantry 20 has the opening 9.

In a transitional operating state of the system 1, the cart F is mounted in such a way that it can be moved along a vertical axis of rotation DA relative to the rail system L via the lifting apparatus H, such that a lifting motion of the cart F along the vertical axis of rotation DA relative to the rail system L can be executed, wherein the computed tomography gantry 20 is held in the cart F in such a way that it follows the lifting motion of the cart F relative to the rail system L. The system 1 has a travel drive FN and a rotary drive DN. The travel drive FN is configured to drive the first translational motion of the cart F and/or to drive the second translational motion of the cart F. The rotary drive DN is configured to drive the rotational motion of the cart F relative to the rail system L about the vertical axis of rotation DA.

Figure 2:
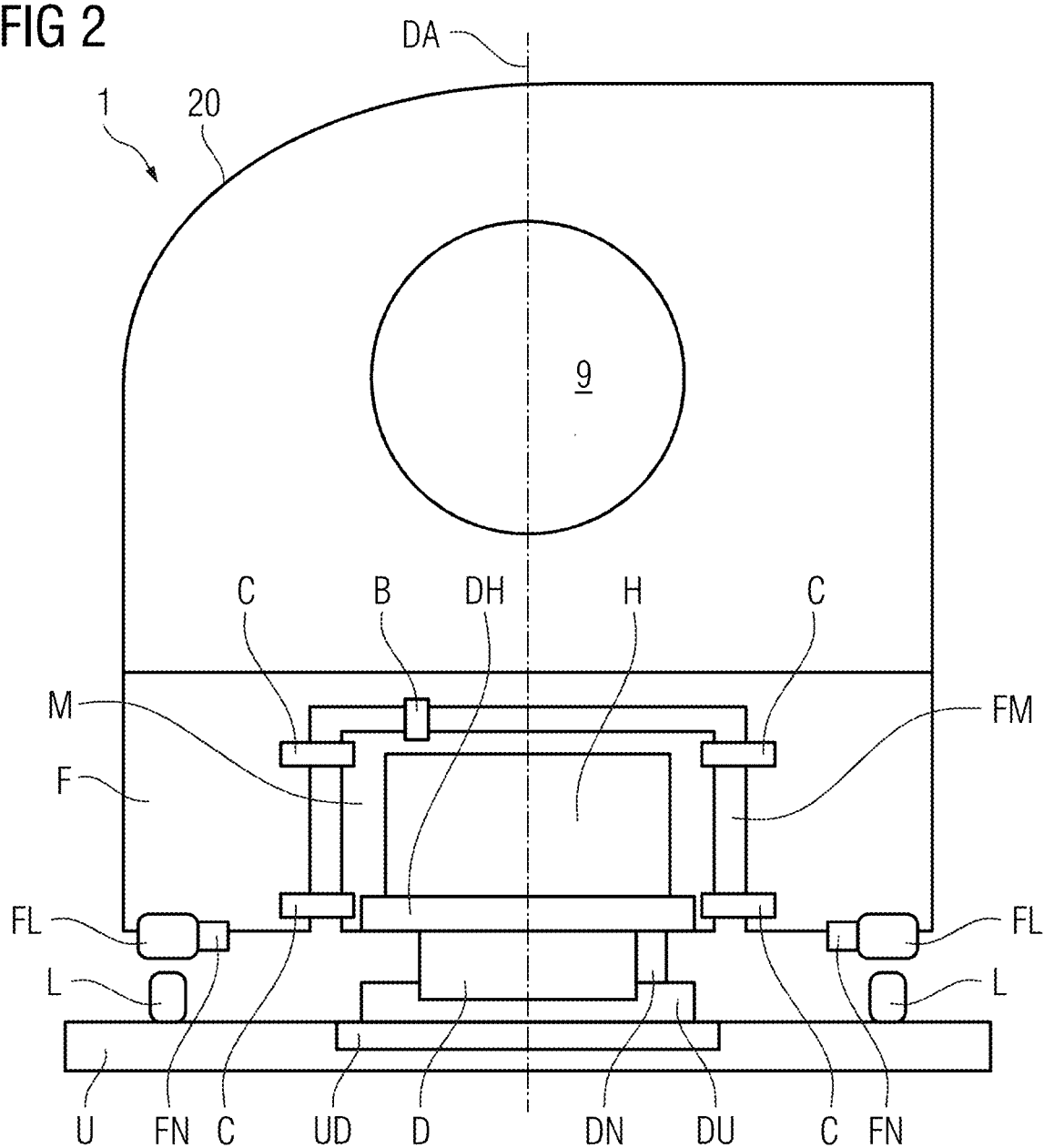
FIG. 2 shows the system comprising the computed tomography gantry, the cart and the rail system in a rotational operating state of the system.

FIG. 2 shows the system 1 comprising the computed tomography gantry 20, the cart F, the rail system L, the rotary bearing D and the lifting apparatus H in a rotational operating state of the system 1, wherein in the rotational operating state of the system 1, the cart F has been lifted along the vertical axis of rotation DA relative to the rail system L via the lifting apparatus H such that the cart F is detached from the rail system L, and the cart F is mounted in such a way that it can be rotated about the vertical axis of rotation DA relative to the rail system L via the rotary bearing D, such that a rotational motion of the cart F about the vertical axis of rotation DA relative to the rail system L can be executed, wherein the computed tomography gantry 20 is held in the cart F in such a way that it follows the rotational motion of the cart F about the vertical axis of rotation DA relative to the rail system L.

The rail system L has a set of rails, with the cart F having a set of wheels FL, with the rotational motion of the cart F about the vertical axis of rotation DA relative to the rail system L taking place from a first angle about the vertical axis of rotation DA to a second angle about the vertical axis of rotation DA, wherein the set of wheels FL is arranged in relation to the vertical axis of rotation DA such that the set of wheels FL can roll on the set of rails when the cart F is arranged in the first angle about the vertical axis of rotation DA relative to the rail system L, and such that the set of wheels FL can roll on the set of rails when the cart F is arranged in the second angle about the vertical axis of rotation DA relative to the rail system L.

The system further comprises the supporting structure UD, with the rail system L being static relative to the supporting structure UD, wherein in the translational operating state of the system 1, the cart F is mounted in such a way that it can be moved along the rail system L relative to the supporting structure UD, such that the first translational motion of the cart F along the rail system L relative to the supporting structure UD can be executed, wherein in the transitional operating state of the system 1 and in the rotational operating state of the system 1, the cart F is braced against the supporting structure UD via the lifting apparatus H and the rotary bearing D.

The system 1 comprises the socket structure DU, with the socket structure DU being mounted in such a way that it can be moved along the vertical axis of rotation DA relative to the cart F via the lifting apparatus H, with the socket structure DU being mounted in such a way that it can be rotated about the vertical axis of rotation DA relative to the cart F via the rotary bearing D, wherein the lifting apparatus H is configured to increase a separation, in comparison with the translational operating state of the system 1, between the socket structure DU and the cart F along the vertical axis of rotation DA, and as a result of the socket structure DU pressing against the supporting structure UD, to raise the cart F relative to the rail system L along the vertical axis of rotation DA such that the cart F is detached from the rail system L, wherein the pressing of the socket structure DU against the supporting structure UD causes the socket structure DU to be secured against any change of angle about the vertical axis of rotation DA relative to the supporting structure UD, such that the cart F is mounted in such a way that it can be rotated about the vertical axis of rotation DA relative to the supporting structure UD via the rotary bearing D, so that the system 1 transitions into the rotational operating state of the system 1.

The socket structure DU is frictionally secured against the change of angle about the vertical axis of rotation DA relative to the supporting structure UD as a result of the socket structure DU pressing against the supporting structure UD, such that the cart F is mounted in such a way that it can be rotated about the vertical axis of rotation DA relative to the supporting structure UD via the rotary bearing D.

The top side of the supporting structure UD is substantially planar. The bottom side of the socket structure DU is substantially planar. The pressing of the socket structure DU against the supporting structure UD produces a frictional engagement between the top side of the supporting structure UD and the bottom side of the socket structure DU, said frictional engagement causing the socket structure DU to be frictionally secured against the change of angle about the vertical axis of rotation DA relative to the supporting structure UD, such that the cart F is mounted in such a way that it can be rotated about the vertical axis of rotation DA relative to the supporting structure UD via the rotary bearing D.

The lifting apparatus H is configured to decrease a separation, in comparison with the rotational operating state of the system 1, between the socket structure DU and the cart F along the vertical axis of rotation DA, and thereby to lower the cart F relative to the rail system L along the vertical axis of rotation DA until the cart F is deposited on the rail system L, so that the system 1 transitions into the translational operating state of the system 1.

The lifting apparatus H and the rotary bearing D are directly coupled together, thereby forming a lift-and-rotate module M, with the cart F having a recess FM for holding the lift-and-rotate module M, with the lift-and-rotate module M being arranged in the recess in such a way that the lifting apparatus H can extend downwards along the vertical axis of rotation DA and out of the recess FM in order to raise the cart F relative to the rail system L along the vertical axis of rotation DA.

The lift-and-rotate module M is detachably connected to the cart F via a mechanical interface C and an electrical interface B. The lift-and-rotate module M can therefore be removed from the cart F and/or installed therein with little effort. In particular, the lift-and-rotate module M can be designed in the form of a plunger.

Figure 3:
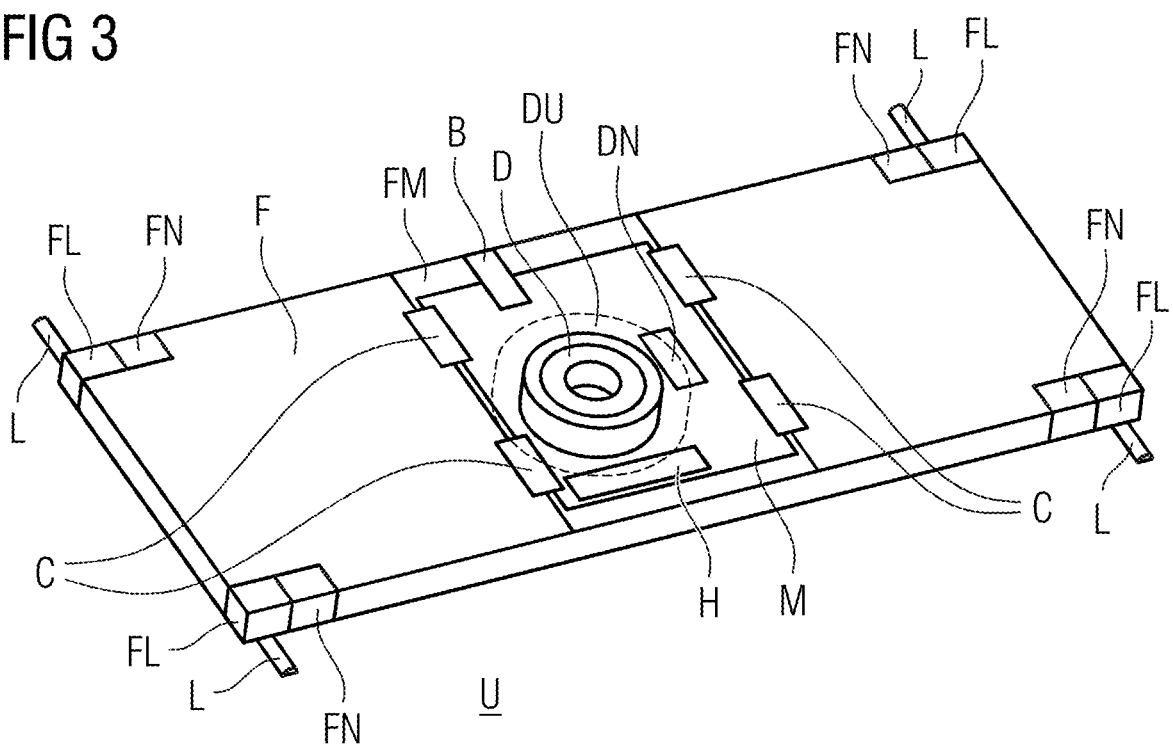
FIG. 3 shows an exemplary cart for the system.

FIG. 3 shows an exemplary cart F for the system 1. FIG. 4 shows a system without the lift-and-rotate module M. Instead of the lift-and-rotate module M, only the structural element M1 is installed therein.

FIG. 5 shows a sequence diagram of a method for moving the computed tomography gantry 20, said method comprising:

executing S1 a first translational motion of a cart F along a rail system L while a system 1 which comprises the computed tomography gantry 20, the cart F, the rail system L, a rotary bearing D and a lifting apparatus H is in a translational operating state of the system 1, wherein in the translational operating state of the system 1, the cart F is mounted in such a way that it can be moved along the rail system L, wherein the computed tomography gantry 20, the rotary bearing D and the lifting apparatus H are each held in the cart F in such a way that they follow the first translational motion of the cart F, executing S2 a lifting motion of the cart F relative to the rail system L along a vertical axis of rotation DA while the system 1 is in a transitional operating state of the system 1, wherein in the transitional operating state of the system 1, the cart F is mounted in such a way that it can be moved along a vertical axis of rotation DA relative to the rail system L via the lifting apparatus H, wherein the computed tomography gantry 20 is held in the cart F in such a way that it follows the lifting motion of the cart F relative to the rail system L, executing S3 a rotational motion of the cart F relative to the rail system L about the vertical axis of rotation DA while the system 1 is in a rotational operating state of the system 1, wherein in the rotational operating state of the system 1, the cart F has been lifted along the vertical axis of rotation DA relative to the rail system L via the lifting apparatus H such that the cart F is detached from the rail system L, and the cart F is mounted in such a way that it can be rotated about the vertical axis of rotation DA relative to the rail system L via the rotary bearing D, wherein the computed tomography gantry 20 is held in the cart F in such a way that it follows the rotational motion of the cart F relative to the rail system L about the vertical axis of rotation DA.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing embodiments. The present invention may, however, be embodied in many alternate forms and should not be construed as limited to only the embodiments set forth herein.

What is claimed is:

1. A system comprising:
a computed tomography gantry;
a cart;
a rail system;
a rotary bearing; and
a lifting apparatus;
wherein, in a translational operating state of the system, the cart is mounted to be movable along the rail system in a first translational motion along the rail system, wherein the computed tomography gantry, the rotary bearing and the lifting apparatus are each held in the cart and follow the first translational motion of the cart;
wherein, in a transitional operating state of the system, the cart is mounted to be movable, via the lifting apparatus, along a vertical axis of rotation relative to the rail system in a lifting motion, wherein the computed tomography gantry is held in the cart and follows the lifting motion of the cart relative to the rail system; and
wherein, in a rotational operating state of the system, the cart is elevated along the vertical axis of rotation relative to the rail system via the lifting apparatus such that the cart is detached from the rail system, and wherein the cart is mounted to be rotatable about the vertical axis of rotation relative to the rail system via the rotary bearing to provide a rotational motion of the cart about the vertical axis of rotation relative to the rail system, wherein the computed tomography gantry is held in the cart and follows the rotational motion of the cart about the vertical axis of rotation relative to the rail system.

2. The system as claimed in claim 1,
wherein the rail system includes a set of rails,
wherein the cart has a set of wheels,
wherein the rotational motion of the cart about the vertical axis of rotation relative to the rail system takes place from a first angle about the vertical axis of rotation to a second angle about the vertical axis of rotation, and
wherein the set of wheels are arranged relative to the vertical axis of rotation such that the set of wheels are configured to roll on the set of rails when the cart is arranged at the first angle, and such that the set of wheels are configured to roll on the set of rails when the cart is arranged at the second angle.

3. The system as claimed in claim 2,
wherein an absolute value of an angular difference between the first angle and the second angle is greater than 0° and less than 360°.

4. The system as claimed in claim 1, further comprising:
a supporting structure,
wherein the rail system is static relative to the supporting structure,
wherein, in the translational operating state of the system, the cart is mounted to be movable along the rail system relative to the supporting structure to provide the first translational motion of the cart along the rail system relative to the supporting structure, and
wherein, in the transitional operating state of the system and in the rotational operating state of the system, the cart is braced against the supporting structure via the lifting apparatus and the rotary bearing.

5. The system as claimed in claim 4,
wherein the system includes a socket structure,
wherein the socket structure is mounted to be movable along the vertical axis of rotation relative to the cart via the lifting apparatus,
wherein the socket structure is mounted to be rotatable about the vertical axis of rotation relative to the cart via the rotary bearing, and wherein the lifting apparatus is configured to increase a separation, in comparison with the translational operating state of the system, between the socket structure and the cart along the vertical axis of rotation, and as a result of the socket structure pressing against the supporting structure, raise the cart relative to the rail system along the vertical axis of rotation such that the cart is detached from the rail system, wherein the pressing of the socket structure against the supporting structure causes the socket structure to be secured against any change in angle about the vertical axis of rotation relative to the supporting structure, such that the cart is mounted to be rotatable about the vertical axis of rotation relative to the supporting structure via the rotary bearing, so that the system transitions into the rotational operating state.

6. The system as claimed in claim 5,
wherein the pressing of the socket structure against the supporting structure causes the socket structure to be frictionally secured against the change of angle about the vertical axis of rotation relative to the supporting structure, such that the cart is mounted to be rotatable about the vertical axis of rotation relative to the supporting structure via the rotary bearing.

7. The system as claimed in claim 6,
wherein a top side of the supporting structure is substantially planar,
wherein a bottom side of the socket structure is substantially planar,
wherein the pressing of the socket structure against the supporting structure produces a frictional engagement between the top side of the supporting structure and the bottom side of the socket structure, and
wherein the frictional engagement causes the socket structure to be frictionally secured against the change of angle about the vertical axis of rotation relative to the supporting structure, such that the cart is mounted to be rotatable about the vertical axis of rotation relative to the supporting structure via the rotary bearing.

8. The system as claimed in claim 5,
wherein the lifting apparatus is configured to decrease a separation, in comparison with the rotational operating state of the system, between the socket structure and the cart along the vertical axis of rotation, and thereby to lower the cart relative to the rail system along the vertical axis of rotation until the cart is set on the rail system, so that the system transitions into the translational operating state.

9. The system as claimed in claim 1,
wherein the lifting apparatus and the rotary bearing are directly coupled together to form a lift-and-rotate module,
wherein the cart has a recess for holding the lift-and-rotate module, and
wherein the lift-and-rotate module is arranged in the recess such that the lifting apparatus is configured to extend downwards along the vertical axis of rotation and out of the recess in order to raise the cart relative to the rail system along the vertical axis of rotation.

10. A method for moving a computed tomography gantry, said method comprising:
executing a first translational motion of a cart along a rail system while a system is in a translational operating state, wherein the system includes the computed tomography gantry, the cart, the rail system, a rotary bearing and a lifting apparatus, wherein, in the translational operating state of the system, the cart is mounted to be moveable along the rail system, wherein the computed tomography gantry, the rotary bearing and the lifting apparatus are each held in the cart and follow the first translational motion of the cart;
executing a lifting motion of the cart relative to the rail system along a vertical axis of rotation while the system is in a transitional operating state of the system, wherein, in the transitional operating state of the system, the cart is mounted to be moveable along the vertical axis of rotation relative to the rail system via the lifting apparatus, wherein the computed tomography gantry is held in the cart and follows the lifting motion of the cart relative to the rail system; and
executing a rotational motion of the cart relative to the rail system about the vertical axis of rotation while the system is in a rotational operating state of the system, wherein, in the rotational operating state of the system, the cart is elevated along the vertical axis of rotation relative to the rail system via the lifting apparatus such that the cart is detached from the rail system, and the cart is mounted to be rotatable about the vertical axis of rotation relative to the rail system via the rotary bearing, wherein the computed tomography gantry is held in the cart and follows the rotational motion of the cart relative to the rail system about the vertical axis of rotation.

11. The method as claimed in claim 10, wherein, following execution of the rotational motion of the cart about the vertical axis of rotation relative to the rail system, the method comprises:
executing a lowering motion of the cart relative to the rail system along the vertical axis of rotation while the system is in the transitional operating state, wherein the computed tomography gantry is held in the cart and follows the lowering motion of the cart relative to the rail system.

12. The method as claimed in claim 11, wherein following execution of the lowering motion of the cart relative to the rail system along the vertical axis of rotation, the method comprises:
executing a second translational motion of the cart along the rail system while the system is in the translational operating state, wherein the computed tomography gantry, the rotary bearing and the lifting apparatus are each held in the cart and follow the second translational motion of the cart,
wherein the rail system has a set of rails,
wherein the cart has a set of wheels,
wherein the rotational motion of the cart about the vertical axis of rotation relative to the rail system takes place from a first angle about the vertical axis of rotation to a second angle about the vertical axis of rotation,
wherein during the first translational motion of the cart along the rail system, the cart is arranged at the first angle about the vertical axis of rotation relative to the rail system and the set of wheels roll on the set of rails, and
wherein during the second translational motion of the cart along the rail system, the cart is arranged at the second angle about the vertical axis of rotation relative to the rail system and the set of wheels roll on the set of rails.

13. The method as claimed in claim 10,
wherein the system further includes a supporting structure, wherein the rail system is static relative to the supporting structure, wherein the first translational motion of the cart along the rail system relative to the supporting structure is executed while the system is in the translational operating state, and wherein following execution of the first translational motion of the cart along the rail system relative to the supporting structure, the cart is braced against the supporting structure via the lifting apparatus and the rotary bearing.

14. The method as claimed in claim 13, wherein the system includes a socket structure, wherein the socket structure is mounted to be movable along the vertical axis of rotation relative to the cart via the lifting apparatus, and wherein the socket structure is mounted to be rotatable about the vertical axis of rotation relative to the cart via the rotary bearing, and wherein, in comparison with the translational operating state of the system, a separation between the socket structure and the cart along the vertical axis of rotation is increased via the lifting apparatus, and as a result of the socket structure pressing against the supporting structure, the cart is raised relative to the rail system along the vertical axis of rotation such that the cart is detached from the rail system, wherein the pressing of the socket structure against the supporting structure causes the socket structure to be secured against rotation about the vertical axis of rotation relative to the supporting structure.

15. The method as claimed in claim 14, wherein the pressing of the socket structure against the supporting structure causes the socket structure to be frictionally secured against rotation about the vertical axis of rotation relative to the supporting structure.

16. The system as claimed in claim 2, further comprising:

a supporting structure, wherein the rail system is static relative to the supporting structure, wherein, in the translational operating state of the system, the cart is mounted to be movable along the rail system relative to the supporting structure to provide the first translational motion of the cart along the rail system relative to the supporting structure, and wherein, in the transitional operating state of the system and in the rotational operating state of the system, the cart is braced against the supporting structure via the lifting apparatus and the rotary bearing.

17. The system as claimed in claim 6, wherein the lifting apparatus is configured to decrease a separation, in comparison with the rotational operating state of the system, between the socket structure and the cart along the vertical axis of rotation, and thereby to lower the cart relative to the rail system along the vertical axis of rotation until the cart is set on the rail system, so that the system transitions into the translational operating state.

18. The system as claimed in claim 7, wherein the lifting apparatus is configured to decrease a separation, in comparison with the rotational operating state of the system, between the socket structure and the cart along the vertical axis of rotation, and thereby to lower the cart relative to the rail system along the vertical axis of rotation until the cart is set on the rail system, so that the system transitions into the translational operating state.

19. The system as claimed in claim 5, wherein the lifting apparatus and the rotary bearing are directly coupled together to form a lift-and-rotate module, wherein the cart has a recess for holding the lift-and-rotate module, and wherein the lift-and-rotate module is arranged in the recess such that the lifting apparatus is configured to extend downwards along the vertical axis of rotation and out of the recess in order to raise the cart relative to the rail system along the vertical axis of rotation.

20. The system as claimed in claim 8, wherein the lifting apparatus and the rotary bearing are directly coupled together to form a lift-and-rotate module, wherein the cart has a recess for holding the lift-and-rotate module, and wherein the lift-and-rotate module is arranged in the recess such that the lifting apparatus is configured to extend downwards along the vertical axis of rotation and out of the recess in order to raise the cart relative to the rail system along the vertical axis of rotation.

* * * * *